United States Patent
Saito

(10) Patent No.: US 7,379,221 B2
(45) Date of Patent: May 27, 2008

(54) LASER SCANNER AND IMAGE FORMING APPARATUS USING IT

(75) Inventor: Hiroshi Saito, Kashiwa (JP)

(73) Assignee: Canon Kabushiki Kaisha (JP)

( * ) Notice: Subject to any disclaimer, the term of this patent is extended or adjusted under 35 U.S.C. 154(b) by 57 days.

(21) Appl. No.: 11/297,534

(22) Filed: Dec. 8, 2005

(65) Prior Publication Data

US 2006/0119918 A1 Jun. 8, 2006

(30) Foreign Application Priority Data

Dec. 8, 2004 (JP) ............................. 2004-355889

(51) Int. Cl.
G02B 26/08 (2006.01)
(52) U.S. Cl. ..................................... 359/203
(58) Field of Classification Search ................ 359/204, 359/205, 203
See application file for complete search history.

(56) References Cited

U.S. PATENT DOCUMENTS

| | | | | |
|---|---|---|---|---|
| 3,762,791 | A * | 10/1973 | Fournier et al. ............ | 359/201 |
| 3,886,309 | A * | 5/1975 | Mason ........................ | 358/480 |
| 4,317,611 | A * | 3/1982 | Petersen ..................... | 359/214 |
| 5,426,528 | A | 6/1995 | Yamamoto et al. | |
| 5,629,790 | A * | 5/1997 | Neukermans et al. ....... | 359/198 |
| 6,005,243 | A * | 12/1999 | Yamazaki ................... | 250/234 |
| 6,020,984 | A | 2/2000 | Hasegawa et al. | |
| 6,362,912 | B1 * | 3/2002 | Lewis et al. ................ | 359/204 |
| 6,433,907 | B1 * | 8/2002 | Lippert et al. .............. | 359/201 |
| 6,654,158 | B2 * | 11/2003 | Helsel et al. ............... | 359/292 |
| 2003/0048516 | A1 * | 3/2003 | Tokunaga ................... | 359/205 |
| 2003/0072066 | A1 * | 4/2003 | Hayashi et al. ............. | 359/201 |
| 2004/0036936 | A1 * | 2/2004 | Nakajima et al. ........... | 359/204 |
| 2004/0183893 | A1 | 9/2004 | Ghang et al. | |

FOREIGN PATENT DOCUMENTS

| EP | 1 275 998 A1 | 1/2003 |
|---|---|---|
| JP | 5-88829 A | 12/1993 |

(Continued)

OTHER PUBLICATIONS

Relevant portion of European Search Report of corresponding European Application EP 05 02 5826.

(Continued)

*Primary Examiner*—Stephone B. Allen
*Assistant Examiner*—Jennifer L Doak
(74) *Attorney, Agent, or Firm*—Rossi, Kimms & McDowell, LLP

(57) ABSTRACT

A laser scanner comprises a laser driver which emits two different laser beams by one main-scanning line in correspondence with an input image signal, and two torsion mirrors to reflect the two different laser beams emitted from the laser beam emission means to scan the laser beams on an opposite photosensitive member. The two torsion mirrors conduct a reciprocal torsion movement in mutual opposite phases in synchronization with each other, and the laser beams reflected from the respective torsion mirrors are emitted alternately by one main-scanning line. Thus a laser scanner which enables image formation upon backward movement of the torsion mirror with a simple structure to increase the resolution and realize high-speed image formation, and an image forming apparatus to which the laser scanner is applied can be provided.

6 Claims, 13 Drawing Sheets

FOREIGN PATENT DOCUMENTS

| | | |
|---|---|---|
| JP | 6-300980 A | 10/1994 |
| JP | 2001-070305 A | 3/2001 |
| JP | 2002-267995 A | 9/2002 |
| KR | 10-2004-0071041 A | 8/2004 |
| TW | 342113 | 5/1986 |
| WO | WO 01/56275 A2 | 8/2001 |

OTHER PUBLICATIONS

Korean Notice of Allowance issued in corresponding Korean Patent Application, with mailing date May 29, 2007.

Search Report and Notice of Allowance issued in corresponding Tawianese patent application No. 094140488, dated Dec. 27, 2007. Partial translation provided.

* cited by examiner

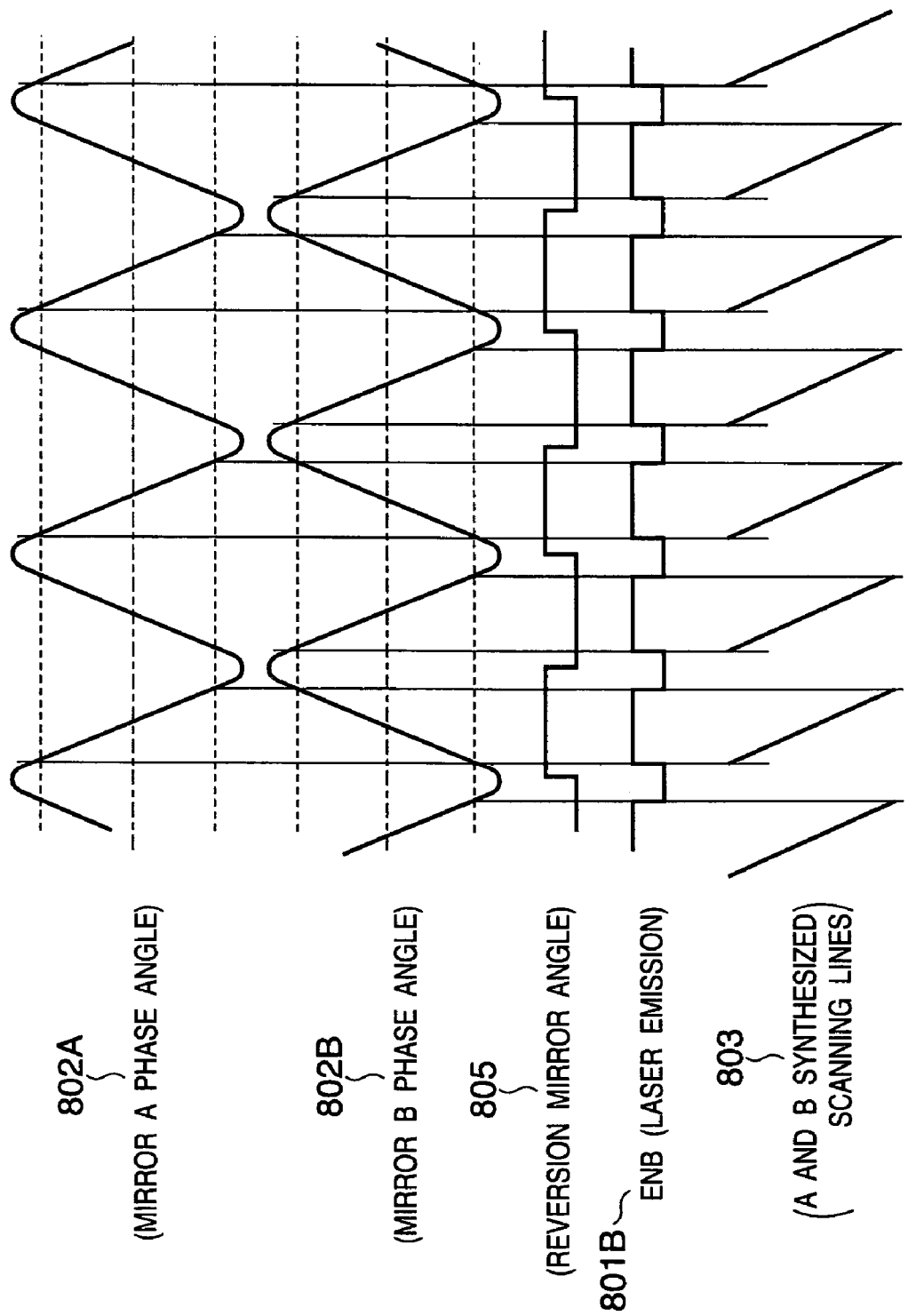

LASER SCANNER AND IMAGE FORMING APPARATUS USING IT

FIELD OF THE INVENTION

The present invention relates to a laser scanner and an image forming apparatus to which the laser scanner is applied, and more particularly, to a laser scanner employed in an electrophotographic image forming apparatus using a scan device based on e.g. MEMS (Micro Electro Mechanical System) technique and an image forming apparatus to which the laser scanner is applied.

BACKGROUND OF THE INVENTION

In a laser scanner used in a conventional electrophotographic image forming apparatus, generally, an electrostatic latent image is formed by emitting a laser beam generated in correspondence with image data on a rotating polygon mirror and scanning the laser beam on an photosensitive member.

However, to realize high-speed and/or high-resolution image formation required in recent years, it is necessary to accelerate the rotation of the polygon mirror to determine the number of subscannings. However, as the rotation speed of polygon mirror has already been increased to almost a physical limitation, it is difficult to further increase the speed dramatically.

To address the above problem, provided is a laser scanner in which a mirror formed by e.g. the MEMS technique, employed in place of the polygon mirror, is torsionally reciprocated. In the scanner, a laser beam is emitted on this mirror and scanned on an photosensitive member.

FIG. 7 shows a schematic structure of the conventional laser scanner.

A laser beam 403 emitted from a laser driver 401 in correspondence with an input image signal (not shown) is reflected with a torsion mirror 402 which is torsionally reciprocated, thereby scanned on a rotating electrostatic drum 104, and forms an electrostatic latent image.

In this case, the torsion mirror 402 operates at a phase angle 602 of torsion movement in FIG. 8. As the torsion mirror 402 conducts an equiangular velocity movement, image formation by emission of laser beam cannot be performed in the whole period, but laser emission is performed only during an ENB (Enable) period 601. As a result, a scanning line 603 is drawn on the electrostatic drum.

FIG. 9 shows scanning of the laser beam on an electrostatic surface. Reference numeral 503 denotes a main scanning direction by the torsion movement of the torsion mirror; and 504, a subscanning direction by rotation of the electrostatic drum. As the laser beam is emitted only during the ENB period 601 corresponding to the forward movement of the torsion mirror, an electrostatic latent image is formed only with a scanning line 501 on the electrostatic drum, and laser emission is not performed in a portion indicated with a broken line 502 corresponding to the backward movement of the torsion mirror. If image formation is performed by emitting laser also in the portion 502, a normal image cannot be obtained since the angle of the scanning line is alternately changed.

[Patent Document 1] Japanese Patent Application Laid-Open No. 2002-267995

However, in the above conventional structure, as image formation cannot be performed in the portion corresponding to the backward movement of the torsion mirror, the resolution is lowered. To raise the resolution, it is necessary to reduce the speed of the subscanning. Otherwise, complicated control is required so as to attain a high speed in the backward movement of the torsion mirror in comparison with that in the forward movement.

SUMMARY OF THE INVENTION

The present invention has been made in view of the above conventional problems, and provides a laser scanner and an image forming apparatus, to which the laser scanner is applied, to realize image formation in the backward movement of the torsion mirror with a simple structure and realize high-resolution and high-speed image formation.

According to the present invention, the foregoing object is attained by providing a laser scanner comprising: laser beam emission means for emitting two different laser beams by one main-scanning line in correspondence with an input image signal; and two torsion mirrors to reflect the two different laser beams emitted from the laser beam emission means to scan the laser beams on an opposite photosensitive member, wherein the two torsion mirrors conduct a reciprocal torsion movement in mutual opposite phases in synchronization with each other, and the laser beams reflected from the respective torsion mirrors are emitted alternately by one main-scanning line.

In the laser scanner, the laser beam emission means has two laser beam emitting units to alternately emit a laser beam by one main-scanning line in correspondence with the input image signal onto one of the two torsion mirrors.

Further, the laser beam emission means has: one laser beam emission unit to emit a laser beam in correspondence with the input image signal; and a reversion mirror to change the direction of the laser beam emitted from the laser beam emission unit alternately toward the two torsion mirrors.

Further, the present invention provides an image forming apparatus having a laser scanner for scanning a laser beam on a drum in correspondence with an image signal, wherein the laser scanner comprising: laser beam emission means for emitting two different laser beams by one main-scanning line in correspondence with an input image signal; and two torsion mirrors to reflect the two different laser beams emitted from the laser beam emission means to scan the laser beams on an opposite photosensitive member, wherein the two torsion mirrors conduct a reciprocal torsion movement in mutual opposite phases in synchronization with each other, and the laser beams reflected from the respective torsion mirrors are emitted alternately by one main-scanning line.

In the image forming apparatus, the laser beam emission means has two laser beam emitting units to alternately emit a laser beam by one main-scanning line in correspondence with the input image signal onto one of the two torsion mirrors. In this case, the image forming apparatus further comprises control means for alternately inputting an image signal into the two laser beam emission units by one main-scanning line.

Further, the laser beam emission means has: one laser beam emission unit to emit a laser beam in correspondence with the input image signal; and a reversion mirror to change the direction of the laser beam emitted from the laser beam emission unit alternately toward the two torsion mirrors.

Accordingly, the present invention provides a laser scanner and an image forming apparatus, to which the laser scanner is applied, to realize image formation in the backward movement of the torsion mirror with a simple structure and realize high-resolution and high-speed image formation.

According to the second and fifth aspects of the invention, by addition of the simple structure having two laser beam emission means and two torsion mirrors corresponding to these laser beam emission means, image formation in the backward movement of the torsion mirror can be realized, and the resolution and the speed of image formation can be increased.

According to the third and seventh aspects of the invention, by addition of the simple structure having one reversion mirror to change the direction of the laser beam and two torsion mirrors, image formation in the backward movement of the torsion mirror can be realized without any change in an image processor, and the resolution and the speed of image formation can be increased.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart showing the operation of the laser scanner according to the embodiment 2;

DETAILED DESCRIPTION OF THE PREFERRED EMBODIMENTS

Hereinbelow, a laser scanner and an image forming apparatus to which the laser scanner is applied, according to the embodiments of the present invention, will now be described in detail in accordance with the accompanying drawings.

Structure and Operation of Laser Scanner in Embodiment 1

Figure 1:
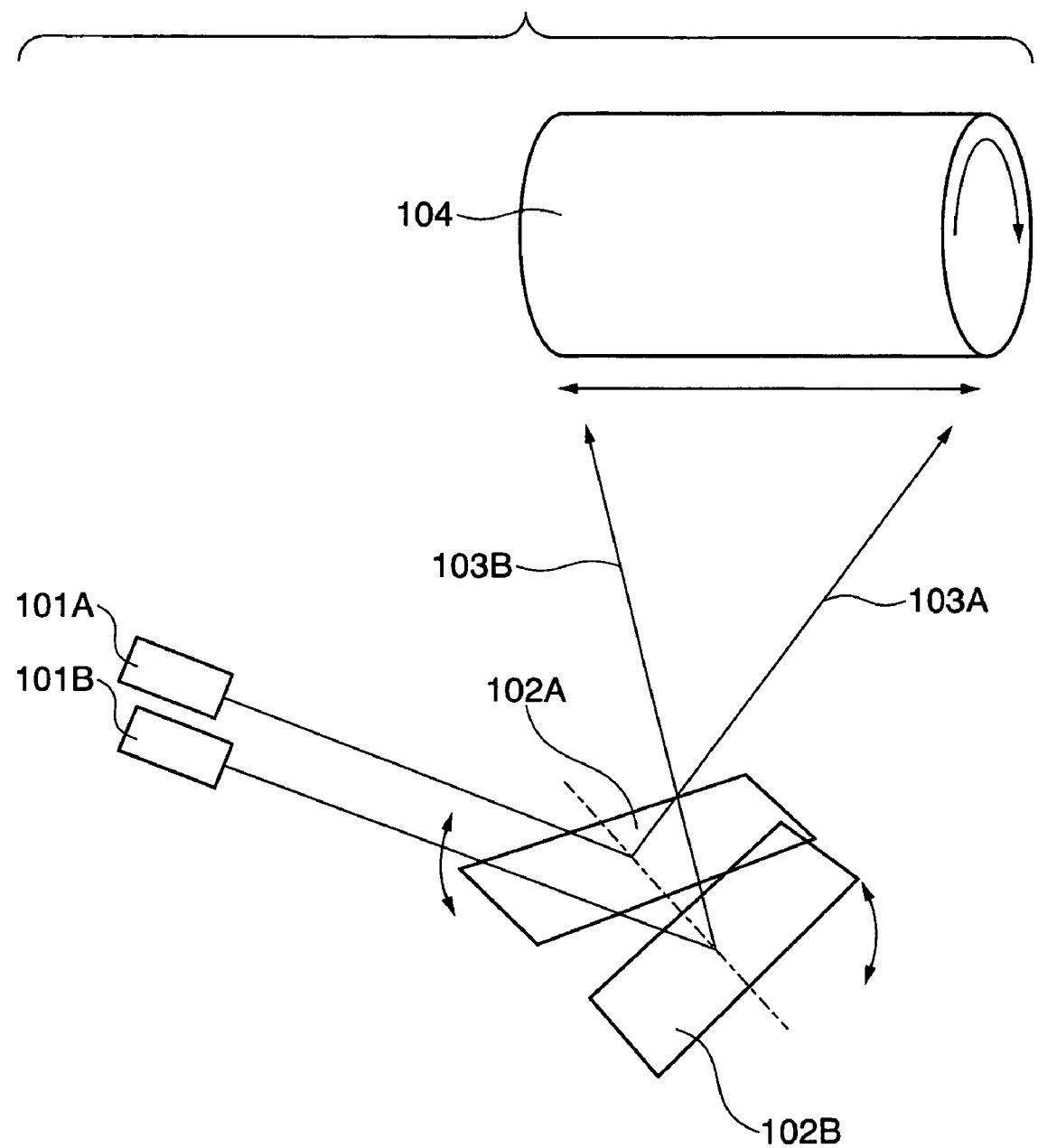
FIG. 1 illustrates an example of the structure of a laser scanner according to an embodiment 1.

FIG. 1 shows an example of the structure of the laser scanner according to an embodiment 1.

A laser beam 103A, emitted from a first laser driver 101A in correspondence with an input image signal (not shown), is scanned on a rotating electrostatic drum 104 with a torsionally-reciprocating first torsion mirror 102A, to form an electrostatic latent image. Similarly, a laser beam 103B, emitted from a second laser driver 101B in correspondence with an input image signal (not shown), is scanned on the rotating electrostatic drum 104 with a torsionally-reciprocating second torsion mirror 102B, to form an electrostatic latent image. Note that in the present embodiment, an image signal is alternately inputted into the first laser driver 101A and the second laser driver 101B by each main scanning, and the respective laser drivers performs image formation in every alternate lines.

Figure 2:
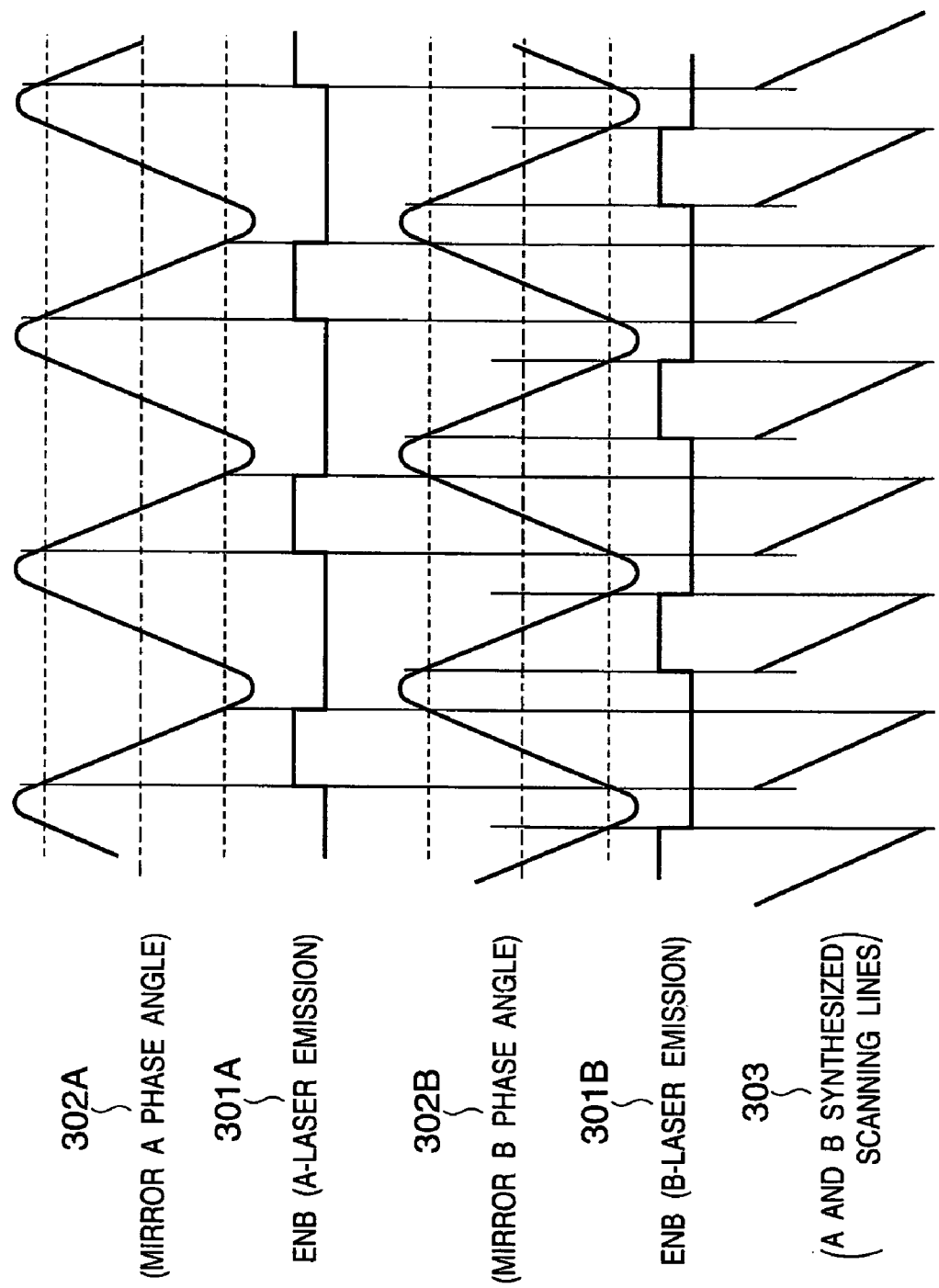
FIG. 2 is a timing chart showing the operation of the laser scanner according to the embodiment 1.

FIG. 2 shows an example of the operation of the laser scanner according to the embodiment 1.

The phase angles of the torsion movements of the two torsion mirrors 102A and 102B are in opposite phases as indicated with mirror A phase angle 302A and mirror B phase angle 302B in FIG. 2. As the torsion mirrors 102A and 102B conduct an /equiangular velocity movement, image formation cannot be performed by emission of laser beam in the whole period. Accordingly, laser emission is made only in periods where an A-laser emission ENB signal 301A and a B-laser emission ENB signal 301B are High. As a result, a scanning line 303, as a synthesis of the A and B scannings, is drawn on the electrostatic drum.

Figure 3:
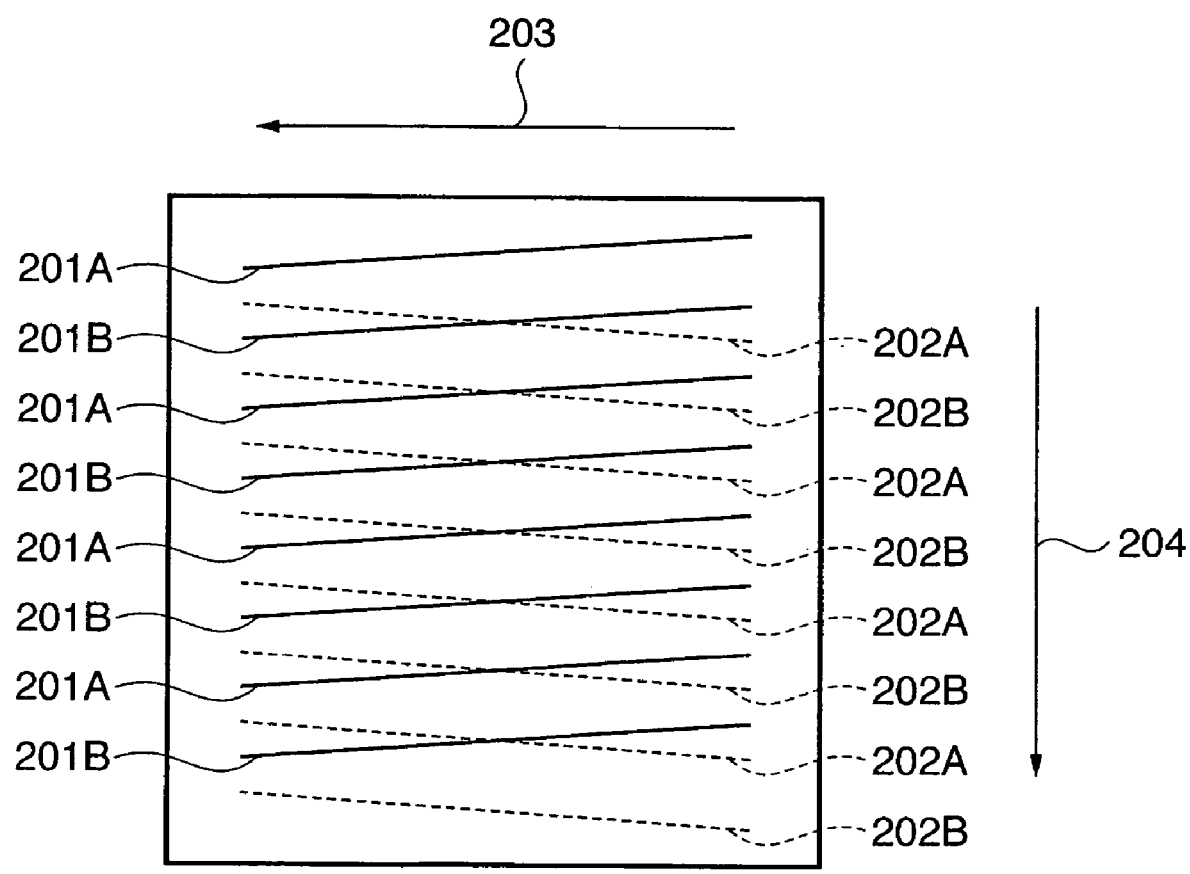
FIG. 3 is a schematic diagram of an electrostatic latent image formed in the embodiments.

FIG. 3 shows the scanning of the laser beam on the electrostatic surface.

Numeral 203 denotes a main scanning direction by the torsion movement of the torsion mirror; and 204, a subscanning direction by rotation of the electrostatic drum. The laser beam is emitted only in the period where the A-laser emission ENB signal 301A is high, corresponding to the forward movement of the reciprocation of the torsion mirror 102A, such that only a scanning line 201A forms an electrostatic latent image on the electrostatic drum, while the laser beam is not emitted in a broken-line portion 202A corresponding to the backward movement of the torsion mirror 102A. Similarly, the laser beam is emitted only in the period where the B-laser emission ENB signal 301B is High, corresponding to the forward movement of the reciprocation of the torsion mirror 102B, such that only a scanning line 201B forms an electrostatic latent image on the electrostatic drum, while the laser beam is not emitted in a broken-line portion 202B corresponding to the backward movement of the torsion mirror 102B.

By this structure and the operation, the resolution in the subscanning direction can be improved without reducing the speed of scanning in the subscanning direction, or without increasing the speed of in the backward movement of the mirror, and as a result, the speed of image formation can be increased.

Structure and Operation of Laser Scanner in Embodiment 2

Figure 4:
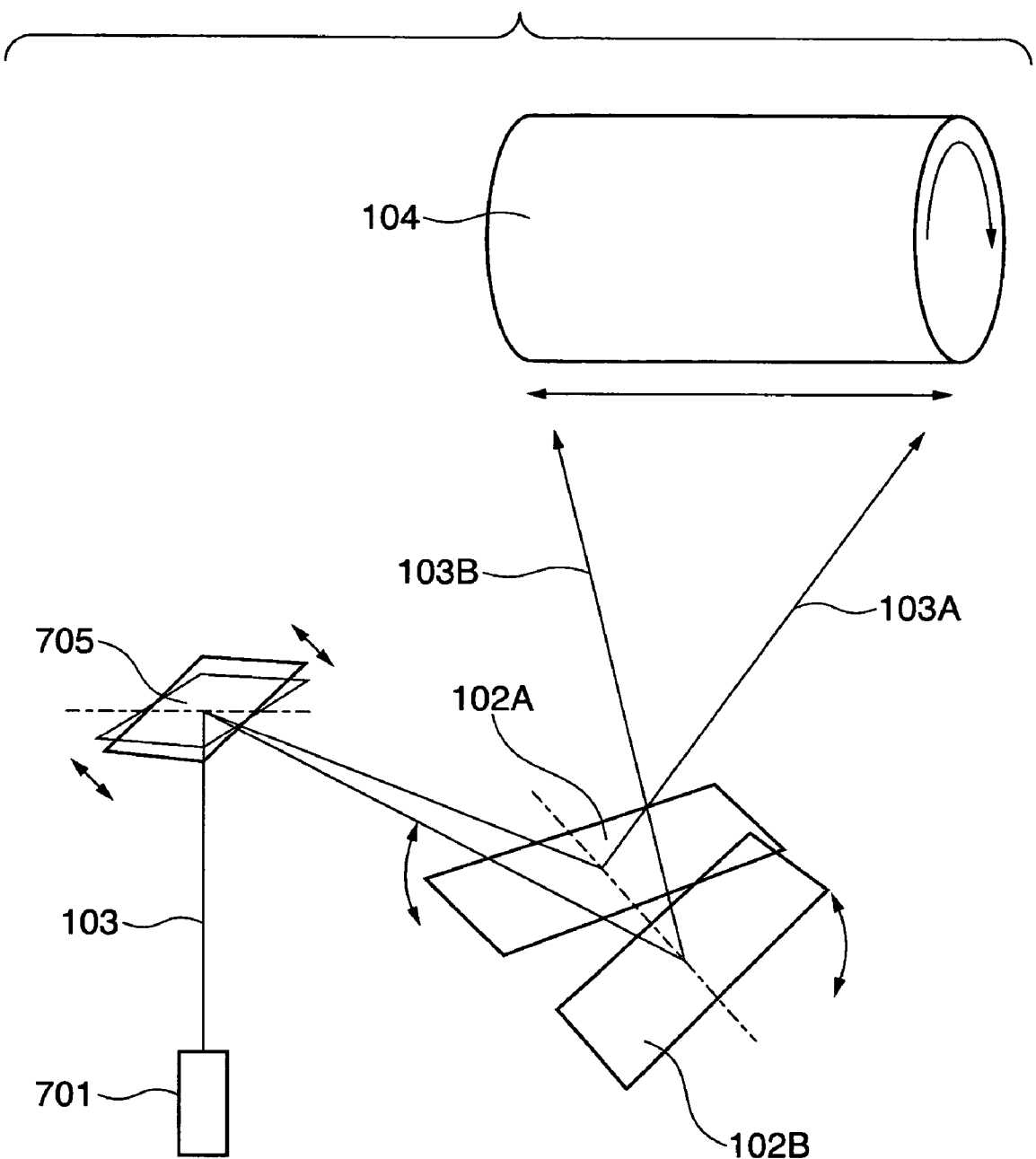
FIG. 4 illustrates an example of the structure of the laser scanner according to an embodiment 2.

FIG. 4 illustrates an example of the structure of the laser scanner according to the embodiment 2.

A laser beam 103, emitted from a laser driver 701 in correspondence with an input image signal (not shown), is reversed with a reversion mirror 705 which alternately moves to two positions (reflection angles) by every main scanning, to be emitted on the two torsion mirrors 102A and 102B to be described later. When the reversion mirror is in an A-position (not shown), the laser beam 103, emitted from a laser driver 701 in correspondence with an input image signal (not shown), is scanned on the rotating electrostatic drum 104 with the torsionally-reciprocating first torsion mirror 102A, to form an electrostatic latent image. Similarly, when the reversion mirror is in a B-position (not shown), the laser beam 103 is scanned on the rotating electrostatic drum 104 with the torsionally-reciprocating second torsion mirror 102B, to form an electrostatic latent image. Note that in the present embodiment, the difference from the embodiment 1 is that image formation can be performed by inputting an image signal into the laser driver 701 sequentially in continuous lines in the subscanning direction as in the case of the conventional art. Accordingly, in comparison with the embodiment 1, the image signal can be easily controlled.

FIG. 5 shows an example of the operation of the laser scanner according to the embodiment 2.

The phase angles of the torsion movements of the two torsion mirrors 102A and 102B are in opposite phases as a mirror A phase angle 802A and mirror B phase angle 802B in FIG 5. As the torsion mirrors 102A and 102B conduct an equiangular velocity movement, image formation cannot be performed by emission of laser beam in the whole period. Accordingly, laser emission is made only in a period where a laser emission ENB signal 801B is High. As a result, a scanning line 803, as a synthesis of the A and B scannings, is drawn on the electrostatic drum.

The scanning of the laser beam on the electrostatic surface is as shown in FIG. 3 as in the case of the embodiment 1. In the embodiment 2, the laser beam is emitted only in a period corresponding to the forward movement of the reciprocation of the torsion mirror 102A, where the reversion mirror 705 is in the A-position, such that only a scanning line 201A forms an electrostatic latent image on the electrostatic drum, while the laser beam is not emitted in a broken-line portion 202A corresponding to the backward movement of the torsion mirror 102A. Similarly, the laser beam is emitted only in the period corresponding to the forward movement of the reciprocation of the torsion mirror 102B, where the reversion mirror 705 is in the B-position, such that only a scanning line 201B forms an electrostatic latent image on the electrostatic drum, while the laser beam is not emitted in a broken-line portion 202B corresponding to the backward movement of the torsion mirror 102B.

By this structure and the operation, the resolution in the subscanning direction can be improved without reducing the speed of scanning in the subscanning direction or without increasing the speed of the backward movement of the mirror, and as a result, the speed of image formation can be increased. Further, the input control of image signal can be simplified.

<Configuration of Image Forming Apparatus Using Laser Scanner>

Figure 6A:
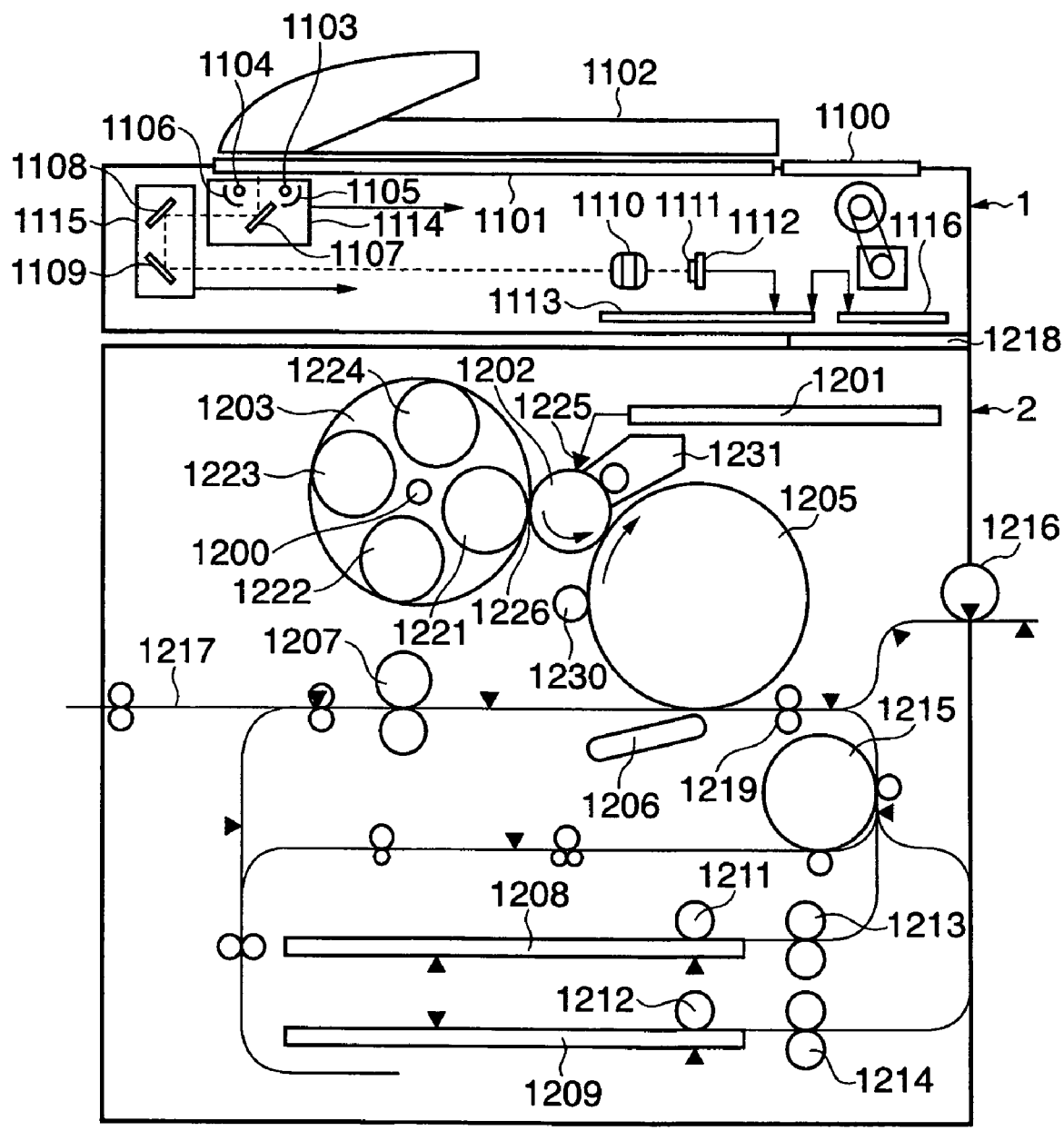
FIG. 6A is a schematic cross-sectional view of an image forming apparatus to which the laser scanner of the invention is applied.

FIG. 6A shows an example of the configuration of the image forming apparatus to which the laser scanner of the present invention is applied. FIG. 6A shows a color complex machine as an example of the image forming apparatus, however, apparently the image forming apparatus may be another machine such as a copier or a printer, otherwise, a part including the laser scanner as a part of the apparatus. The image forming apparatus of the present invention includes the above devices as long as the laser scanner of the present invention is applicable.

An image forming apparatus 50 has a color image reader 1 (hereinbelow, "reader 1") in an upper part, and a color image printer 2 (hereinbelow, "printer 2") in a lower part.

First, the structure of the reader 1 will be described.

Numeral 1101 denotes a glass plate (platen); and 1102, an automatic document feeder (ADF). The automatic document feeder 1102 may be replaced with a mirror-finished platen or white platen (not shown). As light sources 1103 and 1104 to illuminate an original, halogen lamps, fluorescent lamps, xenon lamps or the like are used. Numerals 1105 and 1106 denote reflectors to gather light from the light sources 1103 and 1104 on the original; 1107 to 1109, mirrors; and 1110, a lens to gather reflected light from the original or projection light on a CCD (Charge Coupled Device) image sensor (hereinbelow, "CCD") 1111.

Numeral 1112 denotes a base plate on which the CCD 1111 is mounted; 1100, a controller to control the entire image forming apparatus; and 1113, a digital image processor.

Numeral 1114 denotes a carriage accommodating the light sources 1103 and 1104, the reflectors 1105 and 1106 and the mirror 1107; and 1115, a carriage accommodating the mirrors 1108 and 1109. Note that the carriage 1114 and the carriage 1115 mechanically move respectively at speeds V and V/2 in a subscanning direction Y orthogonal to an electric scanning direction (main scanning direction X) of the CCD 1111, thereby scan the whole surface of the original. Numeral 1116 denotes an external interface (I/F) for communication with another device.

Next, the structure of the color printer 2 will be described.

A control signal from the controller 1100 is received with a printer control I/F 1218, and the printer 2 operates based on the control signal from the printer control I/F 1218.

An electrostatic drum 1202 rotates in a counterclockwise direction. An electrostatic latent image is formed by a laser scanner 1201 according to the present embodiment on the electrostatic drum 1202. developers 1221, 1222, 1223 and 1224 corresponding to black, yellow, magenta and cyan colors are provided around a rotation shaft 1200 of the electrostatic drum. Upon formation of toner image on the electrostatic drum 1202, in the case of color image formation, a rotating color developer 1203 is rotated so as to selectively move one of the developers 1221 to 1224 to a developing position adjacent to (or in contact with) the electrostatic drum 1202 with the rotation shaft 1200 as the center, in correspondence with separated color in the development. The electrostatic latent image is developed with toner supplied from one of the developers 1221 to 1224 by an amount corresponding to the charge on the electrostatic drum 1202.

Note that in the present embodiment, the developers 1221 to 1224 can be easily attached/removed to/from the rotating color developer 1203. In the rotating color developer 1203, setting positions corresponding to black, yellow, magenta and cyan colors are designated in a clockwise direction, and the respective color developers 1221 to 1224 are set in the designated positions. When a monochrome image is developed, only the black developer 1221 is used. In this case, the rotating color developer 1203 is rotated to move the sleeve (not shown) of the black developer 1221 to a visualizing position 1226 opposite to the electrostatic drum 1202, and toner is supplied. When a full color image is developed, all the developers 1221 to 1224 are used. In this case, the rotating color developer 1203 is rotated to move the sleeves of the black, yellow, magenta and cyan developers 1221 to 1224 sequentially to the visualizing position 1226 opposite to the electrostatic drum 1202. A toner image formed on the electrostatic drum 1202 is transferred onto an intermediate transferring medium 1205 rotating in the clockwise direction by rotation of the electrostatic drum 1202 in the counter-clockwise direction. In the case of monochrome image, the transfer onto the intermediate transferring medium 1205 is completed by 1 rotation of the intermediate transferring medium 1205; and in the case of full color image, the transfer is completed by 4 rotations of the intermediate transferring medium 1205. When image formation is performed within a particular sheet size such as A4 size, two images can be formed on the intermediate transferring medium 1205.

On the other hand, a sheet (print sheet), picked up from an upper cassette 1208 or a lower cassette 1209 with a pickup roller 1211 or 1212 and conveyed with a paper feed roller 1213 or 1214, is conveyed with a conveyance roller 1215 to a registration roller 1219. At timing of completion of the transfer onto the intermediate transferring medium 1205, the sheet is conveyed to a position between the intermediate transferring medium 1205 and a transferring belt 1206. Thereafter, the sheet is conveyed with the transferring belt 1206 and press-attached to the intermediate transferring medium 1205, and the toner image on the intermediate transferring medium 1205 is transferred onto the sheet. The toner transferred onto the sheet is heated and pressed with a fixing roller and a pressure roller 1207, thereby fixed to the sheet. The sheet to which the image has been fixed is discharged to a face-up paper discharge opening 1217.

Note that residual toner on the intermediate transferring medium 1205 which has not been transferred onto the sheet is cleaned by postprocessing control in the last half of image forming sequence. In the postprocessing control, the residual toner on the intermediate transferring medium 1205 after the completion of the transfer, as waste toner, is charged with a cleaning roller 1230 to an opposite polarity to the original toner polarity. Then the residual toner with the opposite polarity is re-transferred onto the electrostatic drum 1202. In the electrostatic drum unit, the toner with the opposite polarity is scraped with a blade (not shown) from the drum surface and conveyed to a waste toner box 1231 integrated in the electrostatic drum unit. Thus, the residual toner on the intermediate transferring medium 1205 is completely cleared, and the postprocessing control ends.

Construction of Laser Scanner Controller in Embodiment 1

Figure 6B:
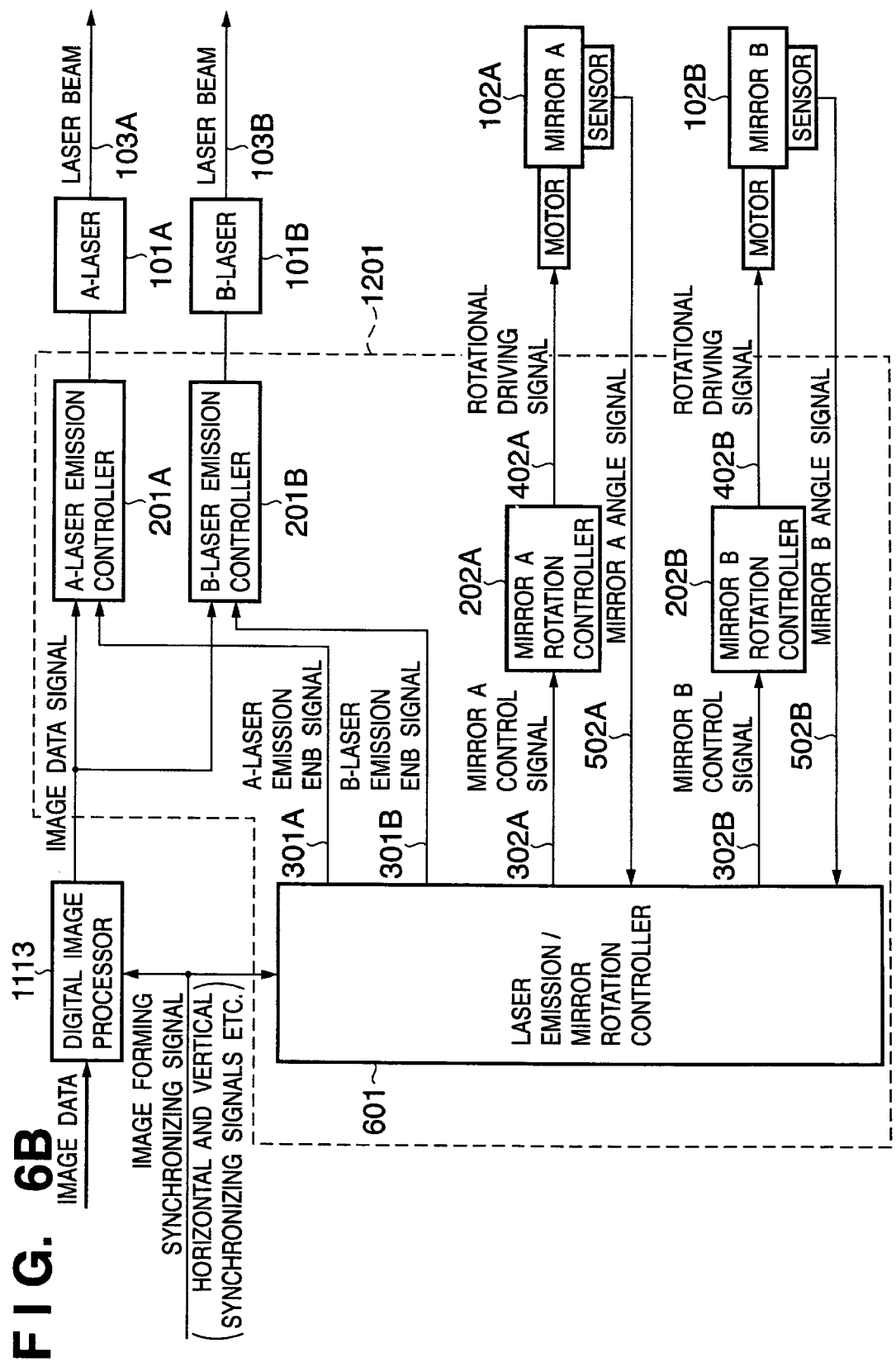
FIG. 6B is a block diagram showing a control construction of the laser scanner according to the embodiment 1.

FIG. 6B is a block diagram showing an example of the construction of a laser scanner controller according to the embodiment 1.

Input image data is converted with a digital image processor 1113 to an image data signal for image formation, and is transferred to a laser scanner controller 1201.

The laser scanner controller 1201 has a laser emission/mirror rotation controller 601 which controls laser emission and mirror rotation in synchronization with the digital image processor 1113 by an image formation synchronizing signal (including a horizontal synchronizing signal, a vertical synchronizing signal and the like). The laser emission/mirror rotation controller 601 may be constructed with hardware or software executed by a CPU or firmware as a combination of hardware and software. Note that in the following description, the respective controllers may also be constructed with any of hardware, software and firmware, and further, the controllers may be respectively constructed as an independent unit, otherwise plural controllers may be controlled by e.g. a common CPU.

First, in the laser emission control, an A-laser emission controller 201A causes light emission from an A-laser 101A based on the image data signal from the digital image processor 1113 and the A-laser emission ENB signal 301A from the laser emission/mirror rotation controller 601. On the other hand, a B-laser emission controller 201B causes light emission from a B-laser 101B based on the image data signal from the digital image processor 1113 and the B-laser emission ENB signal 301B from the laser emission/mirror rotation controller 601. As shown in FIG. 2, when the respective laser emission ENB signals are in the "enable" status, the laser emission controllers 201A and 201B ON/OFF control the lasers in correspondence with the image signal.

Next, in the mirror rotation control, the motor of the mirror A 102A is rotate-driven with a rotation driving signal 402A by a mirror A rotation controller 202A which receives the mirror A control signal 302A as shown in FIG. 2. The current phase angle of the mirror A 102A is detected with a sensor, then fed back as a mirror A angle signal 502A to the laser emission/mirror rotation controller 601, and the phase angle of the mirror A 102A is controlled. On the other hand, the motor of the mirror B 102B is rotate-driven with a rotation driving signal 402B by a mirror B rotation controller 202B which receives the mirror B control signal 302B as shown in FIG. 2. The current phase angle of the mirror B 102B is detected with a sensor, then fed back as a mirror B angle signal 502B to the laser emission/mirror rotation controller 601, and the phase angle of the mirror B 102B is controlled.

Example of Operation Procedure in Laser Scanner Controller in Embodiment 1

Figure 6C:
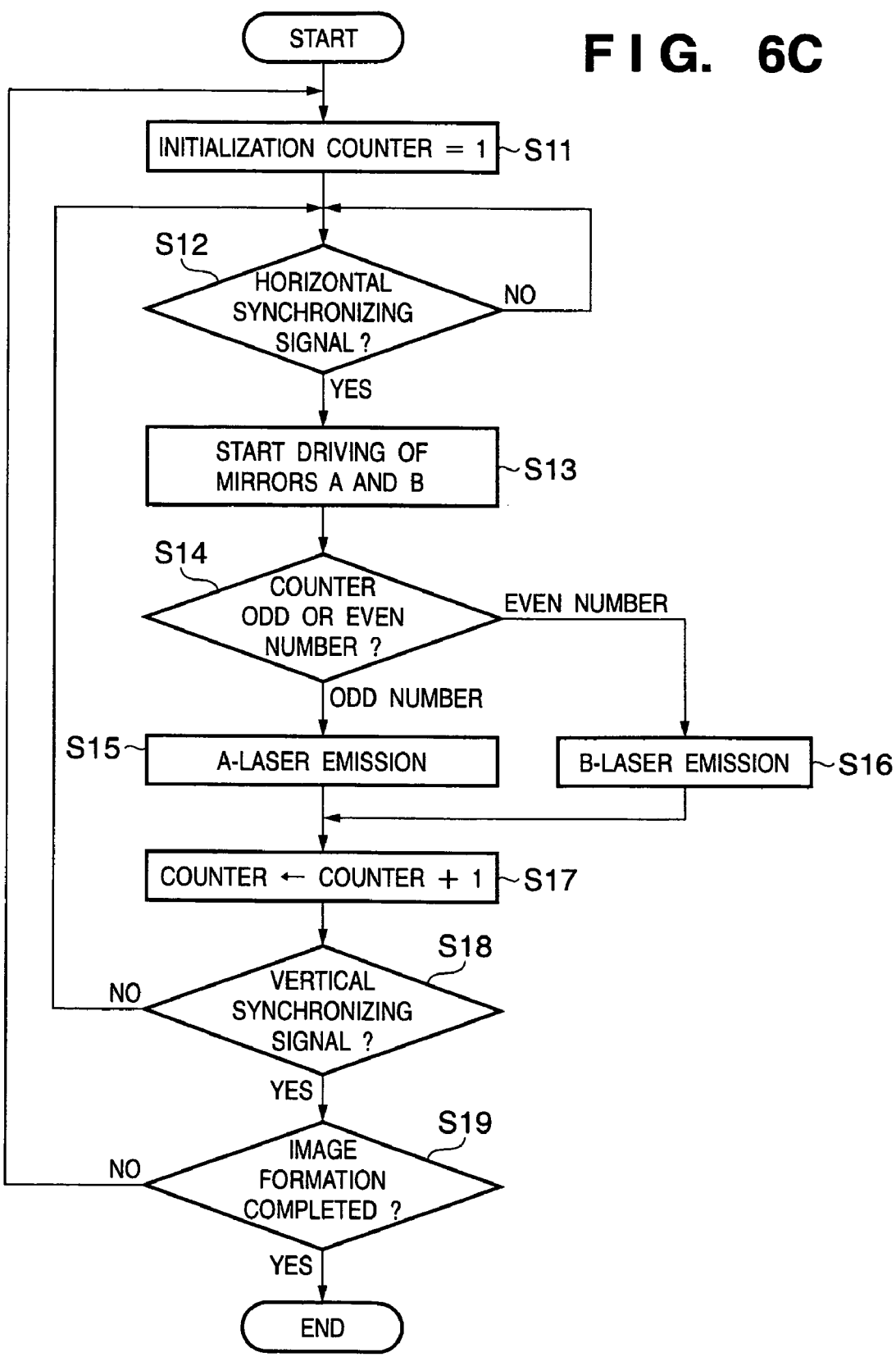
FIG. 6C is a flowchart showing a control procedure in the laser scanner according to the embodiment 1.

FIG. 6C is a flowchart showing an example of the operation procedure in the laser scanner controller in FIG. 6B. Note that as described in the above FIG. 6B, the flowchart does not mean control only by software but also means hardware control and firmware control.

First, at step S11, the rotational positions of the A-laser and the B-laser and the mirror A and the mirror B are initialized. At the same time, the value of a counter for selection of A-laser emission/B-laser emission is initialized to 1. Next, at step S12, the horizontal synchronizing signal is waited, and when the horizontal synchronizing signal is detected, the process proceeds to step S13, at which driving of the mirror A and the mirror B is started.

At step S14, laser emission branching is performed based on whether the counter value is an even number or an odd number. If the counter value is an odd number, light emission is caused from the A-laser 101A at step S15. If the counter value is an even number, light emission is caused from the B-laser 101B at step S16. At step S17, the counter value is incremented, and while the vertical synchronizing signal is not detected, the process returns from step S18 to step S12, at which image formation for the next line is performed by alternately causing light emission from the A-laser 101A and the B-laser 101B.

When the vertical synchronizing signal is detected, the process proceeds to step S19, at which it is determined whether or not the image formation has been completed. If it is determined that the image formation has not been completed, the process returns to step S11, at which initialization for image formation for the next page is performed.

Construction of Laser Scanner Controller in Embodiment 2

Figure 6D:
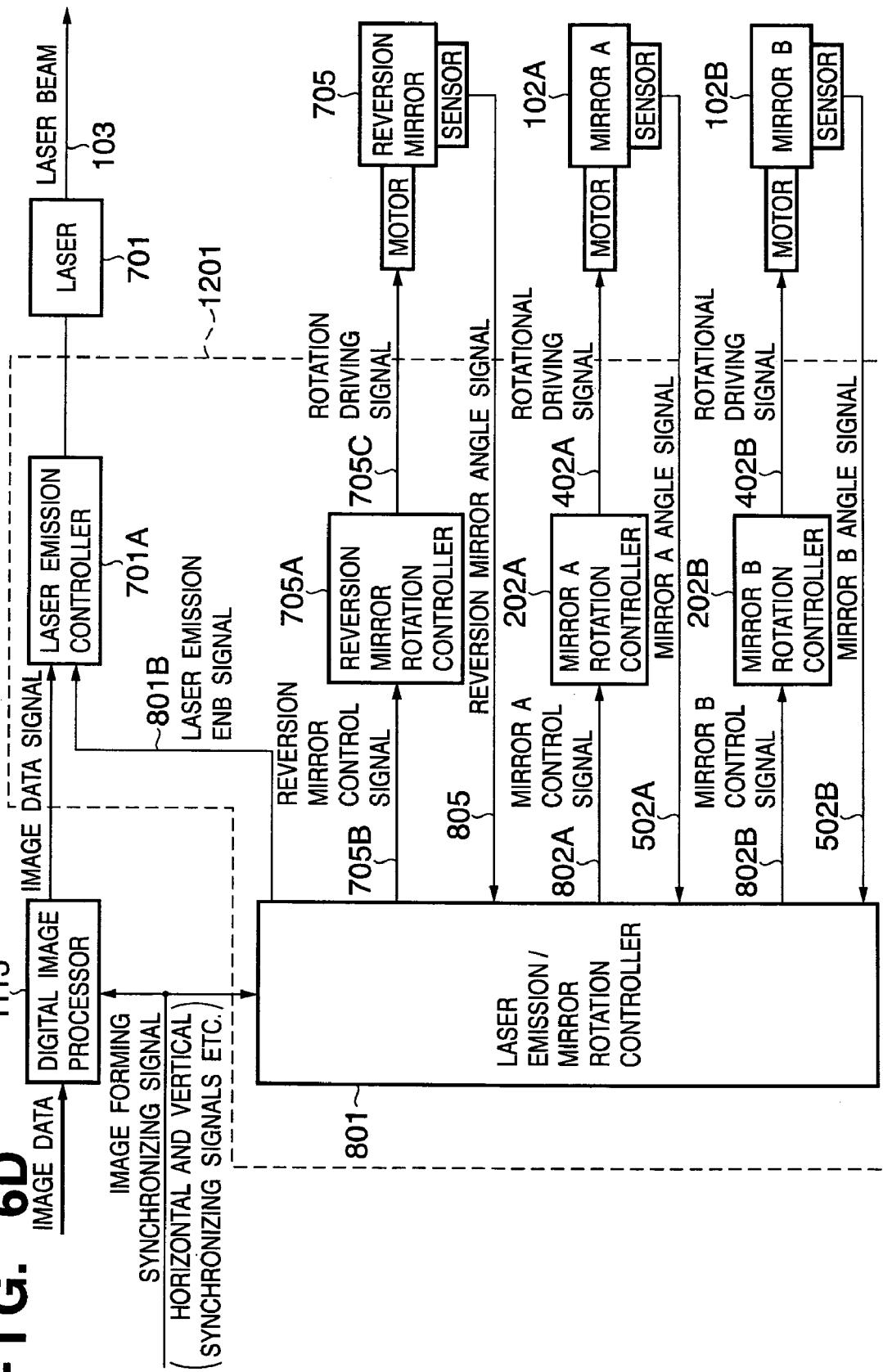
FIG. 6D is a block diagram showing the control construction of the laser scanner according to the embodiment 2.

FIG. 6D is a block diagram showing an example of the construction of the laser scanner controller according to an embodiment 2.

Input image data is converted with a digital image processor 1113 to an image data signal for image formation, and is transferred to a laser scanner controller 1201.

The laser scanner controller 1201 has a laser emission/ mirror rotation controller 801 which controls laser emission and mirror rotation in synchronization with the digital image processor 1113 by an image formation synchronizing signal (including a horizontal synchronizing signal, a vertical synchronizing signal and the like). The laser emission/mirror rotation controller 801 may be constructed with hardware or software executed by a CPU or firmware as a combination of hardware and software. Note that in the following description, the respective controllers may also be constructed with any of hardware, software and firmware, and further, the controllers may be respectively constructed as an independent unit, otherwise plural controllers may be controlled by e.g. a common CPU.

First, in the laser emission control, a laser emission controller 701A causes light emission from a laser 701 based on the image data signal from the digital image processor 1113 and the laser emission ENB signal 801B from the laser emission/mirror rotation controller 801. As shown in FIG. 5, when the laser emission ENB signal is in the "enable" status, the laser emission controller 701A ON/OFF controls the laser in correspondence with the image signal.

Next, in the mirror rotation control, the motor of the reversion mirror 705 is rotate-driven with a rotation driving signal 705C from a reversion mirror rotation controller 705A which receives a reversion mirror control signal 705B. The current phase angle of the reversion mirror 705 is detected with a sensor, then fed back as a reversion mirror angle signal 805 to the laser emission/mirror rotation controller 801, and the angle of the reversion mirror 705 is controlled.

Further, the motor of the mirror A 102A is rotate-driven with the rotation driving signal 402A from the mirror A rotation controller 202A which receives the mirror A control signal 802A as shown in FIG. 5. The current phase angle of the mirror A 102A is detected with a sensor, then fed back as a mirror A angle signal 502A to the laser emission/mirror rotation controller 801, and the phase angle of the mirror A 102A is controlled. On the other hand, the motor of the mirror B 102B is rotate-driven with a rotation driving signal 402B from a mirror B rotation controller 202B which receives the mirror B control signal 802B as shown in FIG. 5. The phase angle of the mirror B 102B is detected with a sensor, then fed back as a mirror B angle signal 502B to the laser emission/mirror rotation controller 801, and the phase angle of the mirror B 102B is controlled.

Example of Operation Procedure in Laser Scanner Controller in Embodiment 2

Figure 6E:
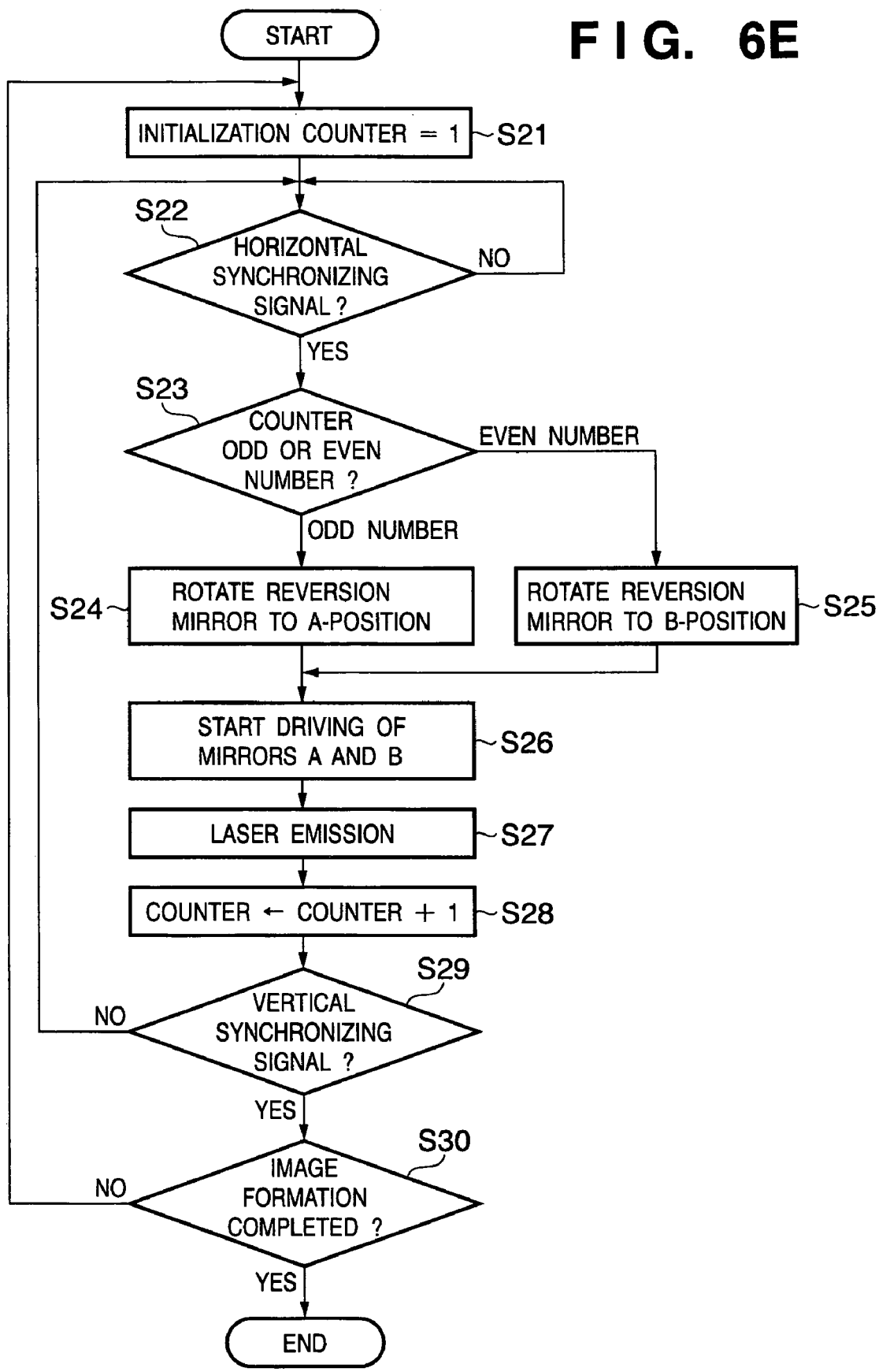
FIG. 6E is a flowchart showing the control procedure in the laser scanner according to the embodiment 2.
Figure 7:
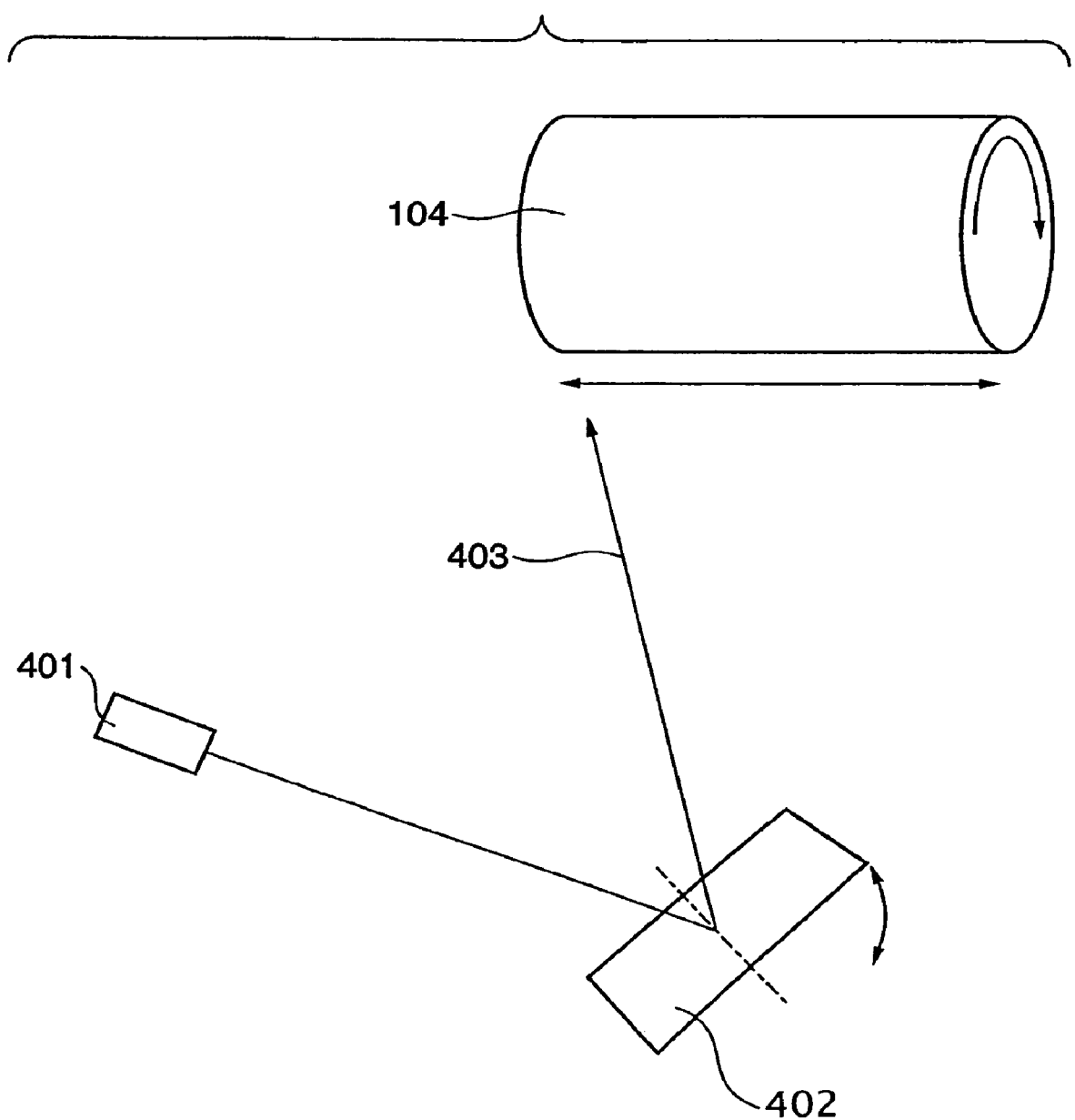
FIG. 7 illustrates the structure of the conventional MEMS laser scanner.
Figure 8:
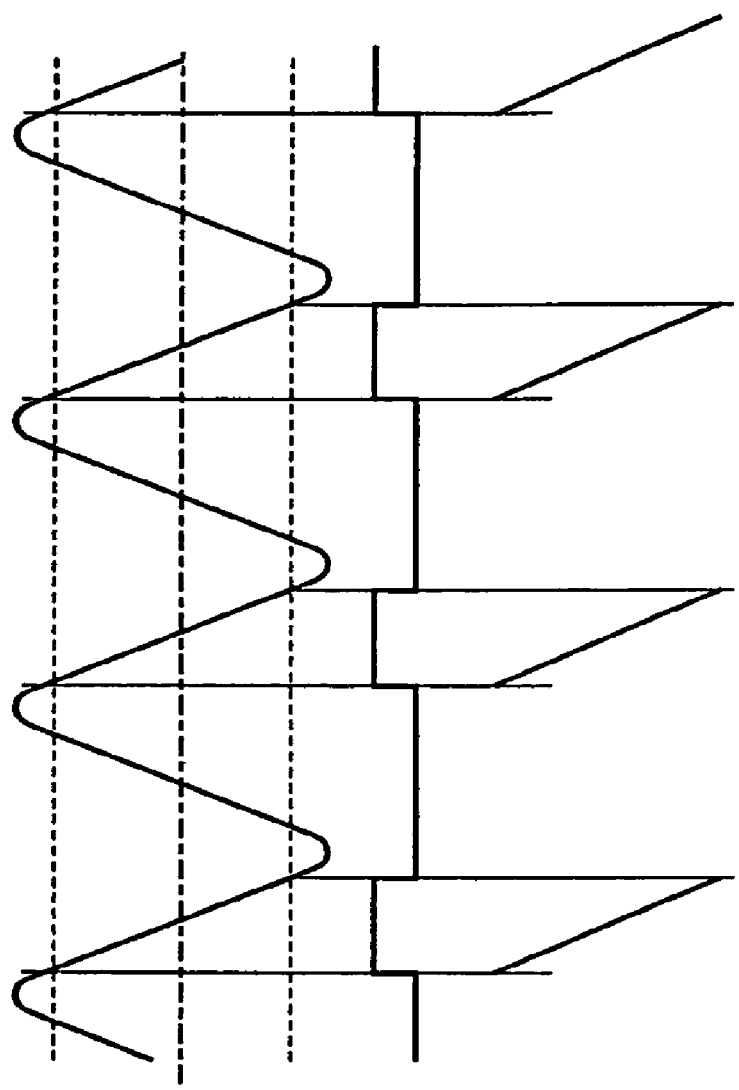
FIG. 8 is a timing chart showing the operation of the conventional MEMS laser scanner.
Figure 9:
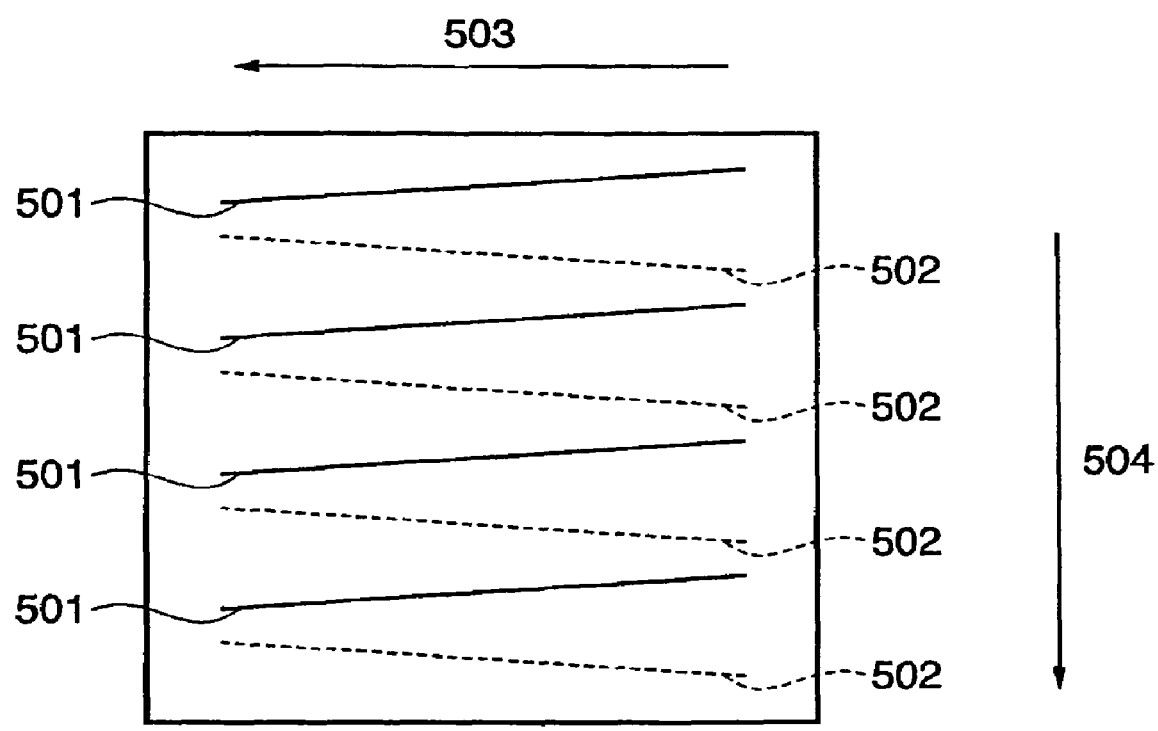
FIG. 9 is a schematic diagram showing an electrostatic latent image formed by the conventional MEMS laser scanner.

FIG. 6E is a flowchart showing an example of the operation procedure in the laser scanner controller in FIG. 6D. Note that as described in the above FIG. 6D, the flowchart does not mean control only by software but also means hardware control and firmware control.

First, at step S21, the rotational positions of the laser and the mirror A and the mirror B are initialized. At the same time, the value of a counter for selection of the angle of the reversion mirror 705 is initialized to 1. Next, at step S22, the horizontal synchronizing signal is waited, and when the horizontal synchronizing signal is detected, the process proceeds to step S23.

At step S23, branching of reversion mirror angle is performed based on whether the counter value is an even number or an odd number. If the counter value is an odd number, the reversion mirror 705 is rotated to the A-position (an angle where the laser is turned toward the mirror A 102A) at step S24. If the counter value is an even number, the reversion mirror 705 is rotated to the B-position (an angle where the laser is turned toward the mirror B 102B) at step S25. At step S26, rotation driving of the mirror A and the mirror B is started, and at step S27, light emission from the laser 701 is started.

At step S28, the counter value is incremented, and while the vertical synchronizing signal is not detected, the process returns from step S29 to step S22, at which image formation for the next line is performed by rotating the reversion mirror 705 so as to reverse the laser beam to the mirror A/mirror B by line.

When the vertical synchronizing signal is detected, the process proceeds to step S30, at which it is determined whether or not the image formation has been completed. If it is determined that the image formation has not been completed, the process returns to step S21, at which initialization for image formation for the next page is performed.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-355889 filed on Dec. 8, 2004, which is hereby incorporated by reference herein.

What is claimed is:

1. A laser scanner comprising:
    laser beam emission means for alternately emitting a first laser beam and a second laser beam, each beam being emitted in correspondence with an input image signal of an alternate main-scanning line;
    a first torsion mirror to reflect said first laser beam emitted from said laser beam emission means to scan the first laser beam on a photosensitive member; and
    a second torsion mirror to reflect said second laser beam emitted from said laser beam emission means to scan the second laser beam on the photosensitive member,
    wherein said first and second torsion mirrors perform a reciprocal torsion movement in mutual opposite phases in synchronization with each other, so that the first laser beam reflected by said first torsion mirror and the second laser beam reflected by said second torsion mirror scan on the photosensitive member in opposite main-scanning directions at a time,
    wherein the first and second laser beams reflected from said respective first and second torsion mirrors are emitted alternately by one main-scanning line by alternately performing scanning of the first laser beam reflected by said first torsion mirror on the photosensitive member in a main-scanning direction while said first torsion mirror performs a forward movement but said second torsion mirror performs a backward movement, and scanning of the second laser beam reflected by said second torsion mirror on the photosensitive member in the same main-scanning direction while said first torsion mirror performs a backward movement but said second torsion mirror performs a forward movement, and wherein said the first and second torsion mirrors reciprocate in synchronism in opposite directions about a same rotational axis.

2. The laser scanner according to claim 1, wherein said laser beam emission means comprises:

one laser beam emission unit to emit a laser beam in correspondence with the input image signal; and a reversion mirror to change the direction of the laser beam emitted from said laser beam emission unit alternately toward said first and second torsion mirrors.

3. An image forming apparatus having a laser scanner for scanning a laser beam on an photosensitive member in correspondence with an image signal, said laser scanner comprising:

laser beam emission means for alternately emitting a first laser beam and a second laser beam, each beam being emitted in correspondence with an input image signal of an alternate main-scanning line;

a first torsion mirror to reflect said first laser beam emitted from said laser beam emission means to scan the first laser beam on the photosensitive member; and a second torsion mirror to reflect said second laser beam emitted from said laser beam emission to scan the second laser beam on the photosensitive member, wherein said first and second torsion mirrors perform a reciprocal torsion movement in mutual opposite phases in synchronization with each other, so that the first laser beam reflected by said first torsion mirror and the second laser beam reflected by said second torsion mirror scan on the photosensitive member in opposite main-scanning directions at a time, wherein the first and second laser beams reflected from said respective first and second torsion mirrors are emitted alternately by one main-scanning line by alternately performing scanning of the first laser beam reflected by said first torsion mirror on the photosensitive member in a main-scanning direction while said first torsion mirror performs a forward movement but said second torsion mirror performs a backward movement, and scanning of the second laser beam reflected by said second torsion mirror on the photosensitive member in the same main-scanning direction while said first torsion mirror performs a backward movement by said second torsion mirror performs a forward movement, and wherein said first and second torsion mirrors reciprocate in synchronism in opposite directions about a same rotational axis.

4. The image forming apparatus according to claim 3, further comprising control means for alternately inputting an image signal into said laser beam emission means on an alternate main-scanning line.

5. A laser scanner comprising:

laser beam emission means for emitting laser beams; and a first torsion mirror and a second torsion mirror for reflecting each of the laser beams emitted from said laser beam emission means to scan the emitted laser beams on a photosensitive member forward and backward, wherein said first and second torsion mirrors perform a reciprocal torsion movement in mutual opposite phases in synchronization with each other, and wherein when said first torsion mirror is moving forward but said second torsion mirror is moving backward, a first laser beam reflected by said first torsion mirror scans on the photosensitive member in a main-scanning direction but a second laser beam reflected by said second torsion mirror does not scan on the photosensitive member, while when said first torsion mirror is moving backward but said second torsion mirror is moving forward, the second laser beam reflected by said second torsion mirror scans on the photosensitive member in the same main-scanning direction but the first laser beam reflected by said first torsion mirror does not scan on the photosensitive member, thereby forming an image on the photosensitive member as the first and second beams alternately scan on the photosensitive member.

6. The laser scanner according to claim 5, wherein said laser beam emission means comprises two laser beam emitting units to alternately emit a laser beam by one main-scanning line in correspondence with the input image signal onto one of said first and second torsion mirrors.

* * * * *